(12) United States Patent
Pinnamaneni et al.

(10) Patent No.: US 11,652,770 B1
(45) Date of Patent: May 16, 2023

(54) METHODS AND SYSTEMS FOR BLOCKING EXPOSURE OF INTERNAL ARCHITECTURE (71) Applicant: MASTERCARD INTERNATIONAL INCORPORATED, Purchase, NY (US)

(72) Inventors: Venkata Satya Sivajee Pinnamaneni, Dardenne Prairie, MO (US); Kaushal Shetty, Thane (W) Maharashtra (IN); Sachin Kumar Singh, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/567,036

(22) Filed: Dec. 31, 2021

(51) Int. Cl.
*H04L 51/212* (2022.01)
*H04L 51/42* (2022.01)
*H04L 9/40* (2022.01)

(52) U.S. Cl.
CPC ............ *H04L 51/212* (2022.05); *H04L 51/42* (2022.05); *H04L 63/126* (2013.01); *H04L 63/1425* (2013.01); *H04L 63/1433* (2013.01); *H04L 63/1441* (2013.01)

(58) Field of Classification Search
CPC ... H04L 51/212; H04L 51/42; H04L 63/1425; H04L 63/1441
See application file for complete search history.

(56) References Cited

U.S. PATENT DOCUMENTS

| | | |
|---|---|---|
| 2013/0333026 A1 | 12/2013 | Starink et al. |
| 2019/0297046 A1* | 9/2019 | Greenspan ............... H04L 51/42 |
| 2020/0396190 A1* | 12/2020 | Pickman .............. H04L 63/1483 |
| 2021/0058358 A1 | 2/2021 | Khan |
| 2021/0126944 A1 | 4/2021 | Lesperance et al. |
| 2021/0243147 A1* | 8/2021 | Patrick ..................... G06F 21/31 |
| 2021/0273961 A1* | 9/2021 | Humphrey ............ H04L 43/028 |

* cited by examiner

*Primary Examiner* — Minh Chau Nguyen
(74) *Attorney, Agent, or Firm* — Barta, Jones & Foley, PLLC (57) ABSTRACT

Systems and methods are provided for determining if an e-mail originating from an external source is deemed malicious and thereby preventing an out of office e-mail reply. One example method includes receiving, at a computing device of a service provider, an e-mail identified as originating from an external source, scanning the e-mail to identify at least one parameter only when an out of office reply is setup by a recipient of the e-mail, comparing the at least one scanned parameter to a set of known parameters, calculating a score of the e-mail based on the comparison of the at least one parameter to a set of known parameters, determining the e-mail to be a malicious e-mail if the score exceeds a threshold value and blocking an out of office reply based on the threshold value.

20 Claims, 6 Drawing Sheets

METHODS AND SYSTEMS FOR BLOCKING EXPOSURE OF INTERNAL ARCHITECTURE

BACKGROUND

This section provides background information related to the present disclosure which is not necessarily prior art.

E-mail has become an efficient form of communication widely used by individuals and organization. More and more people rely on e-mail to communicate with friends, family, colleagues, customers, and business partners. Unfortunately, as e-mail usage has increased so too have the threats associated with e-mail. There has been a sudden surge in ransomware and other e-mail attacks happening across organizations, causing reputational and financial damage to businesses. Since these e-mails are part of daily life, users are vigilant enough to not click any links coming from outside organizations.

However, there are scenarios where users might inadvertently give away critical inside information of our security/scanning systems to outside people. For example, the moment out of office automatic replies are generated, a timeline of leave and mention of additional employees' names/e-mails are included for escalations and in many cases, mobile numbers are also included. In this scenario, a set of target people for attackers are created who will send malicious e-mail links, and in return, the attackers will get these response details. They will also get to know the IP (Internet Protocol) through which packets are travelling, message ID, server details, SMTP server (version, cypher) etc. Therefore, there is a need for providing a system and method that prevents identifying information and links to be sent to originators of malicious e-mail without interrupting the intended use of out of office reply e-mails.

SUMMARY

The present disclosure includes a method for automatically identifying a malicious e-mail and blocking an out of office reply. The method comprises receiving, at a computing device of a service provider, an e-mail identified as originating from an external source and scanning the e-mail to identify at least one parameter. The at least one parameter is then compared to a set of known parameters and a score is calculated. If the score exceeds a threshold value, the e-mail is determined to be malicious. An out of office reply e-mail is blocked if the e-mail is determined to be a malicious e-mail.

The operation of scanning the e-mail is executed only when an out of office reply is setup by a recipient of the e-mail, in some examples. The score is a value defined as low, medium, and high, in some examples, and the malicious e-mail is based on a score of medium or high, in some examples. If the score is low, the out of office reply is sent to the intended recipient. If the score is medium or high, the recipient is notified of the e-mail after blocking the out of office reply e-mail.

Identifying at least one parameter includes, for example, one or more of identifying simple mail transfer protocol (SMTP) mail from and return path, evaluating the e-mail travel path, analyzing the e-mail domain to identify origin and location, reading the e-mail client, identifying a DomainKeys Identified Mail (DKIM) Signature or its equivalent, and identifying presence of X-UIDL fields. Comparing the at least one parameter to a set of known parameter includes, for example, one or more of comparing the SMTP mail from and return path to identify a match, evaluating the e-mail travel path to determine if origin is a suspicious source, analyzing the e-mail domain to identify if origin and location is from a suspicious zone, reading the e-mail client, identifying a DKIM-Signature or its equivalent and analyzing its presence, and identifying presence of X-Unique Identification Listing (X-UIDL) fields.

A further embodiment discloses the computer-implemented method for automatically identifying a malicious e-mail and blocking an out of office reply. This embodiment includes receiving, at a computing device of a service provider, an e-mail identified as originating from an external source and scanning the e-mail to identify at least one parameter. Next, the at least one scanned parameter is compared to a set of known parameters and a score of the e-mail is calculated based on the comparison of the at least one parameter to the known parameters. Lastly, the e-mail is determined to be a malicious e-mail if the score exceeds a threshold value, wherein an out of office reply e-mail is blocked by the service provider based on the score.

Another embodiment includes a network device including a non-transitory computer-readable medium including instructions that, when executed by the one or more processors, cause the one or more processors to perform various operations. The processor receives at a computing device of a service provider, an e-mail identified as originating from an external source; The processer scans the e-mail to identify at least one parameter only when an out of office reply is setup by a recipient of the e-mail. Next, the processor compares the at least one scanned parameter to a set of known parameters and calculates a score of the e-mail based on the comparison of the at least one parameter to the known parameters. Finally, the processor determines the e-mail to be a malicious e-mail if the score exceeds a threshold value and blocking an out of office reply e-mail based on the threshold value.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Electronic mail or e-mail implemented on desktop computers, laptops, or mobile devices are basic communication services provided to users. However, e-mail is a great source of pushing ransomware or malicious attacks to employees in organizations that are trying to protect e-mail attacks by using antivirus software or other similar shields. Antivirus software will scan the e-mail that is found suspicious and will label these e-mails as either external or generate a red flag banner on top of the e-mail. In this instance it is the e-mail recipient who chooses whether to report the suspicious e-mail or click on the links inside that e-mail. Furthermore, typical antivirus software flags the e-mail but does not prevent identifying information contained in an out of office reply from being sent to the e-mail sender.

The present disclosure is generally directed to systems and methods for controlling a computing device to block exposure of internal architecture of an organization and, in particular, to identify malicious e-mails and block automatically generated out of office replies (or other auto-replies). In some examples, the system controls an interface to prevent identifying information and links to be sent to originators of malicious e-mail without interrupting the intended use of out of office reply e-mails.

Figure 1:
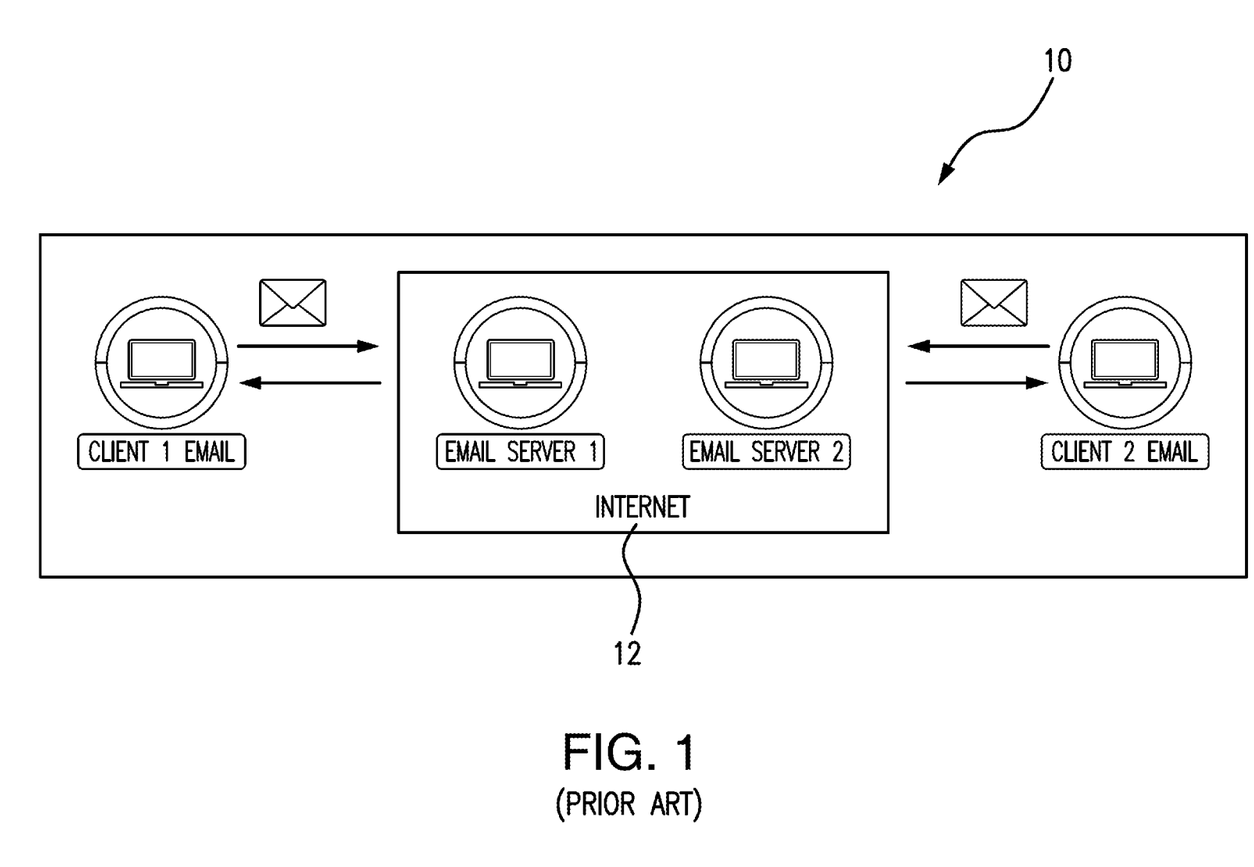
FIG. 1 is an example of a prior art system illustrating how conventional e-mails are received and sent.

FIG. 1 illustrates a prior art system 10 where e-mail is sent and received to an intended user/recipient. As shown in this conventional system 10, e-mail servers 1 and 2 are connected through a network 12 that simply allows e-mail from client 1 to travel to server 2 and reach client 2 and vice versa. Generally, in this scenario antivirus software is only located or installed in the device (e.g., desktop, laptop, or another mobile device) of each individual client. Even though the antivirus software may alert client 1 or client 2 of a potential malicious e-mail, the system 10 still allows the out of office reply to be automatically sent and therefore exposes other individuals or the internal architecture of the organization.

Figure 2:
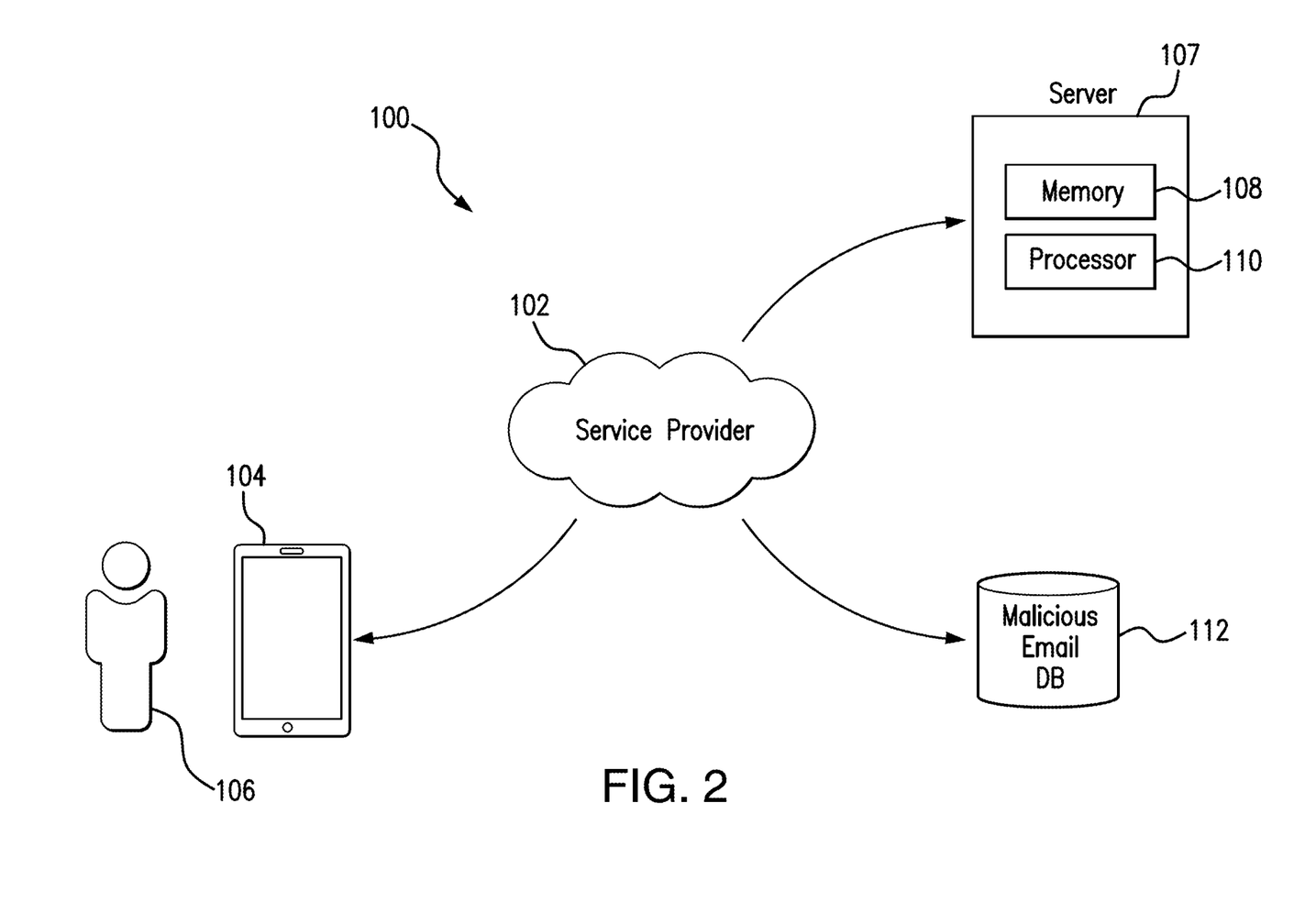
FIG. 2 is a block diagram of an exemplary system and method for blocking exposure of internal architecture.
Figure 3A:
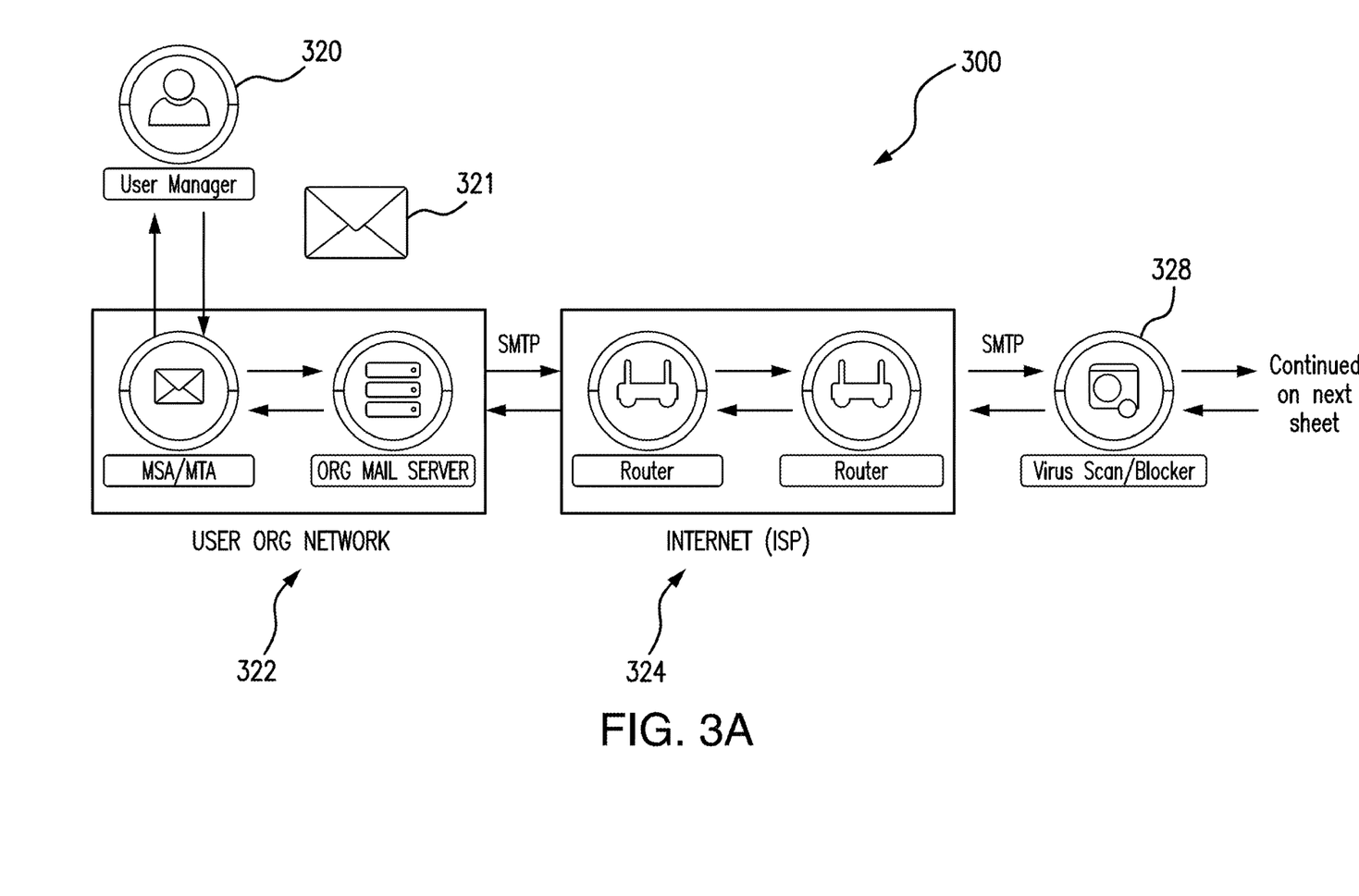
FIG. 3 is a system architecture for implementing the system of FIG. 2 and a method of blocking exposure of internal architecture.
Figure 3B:
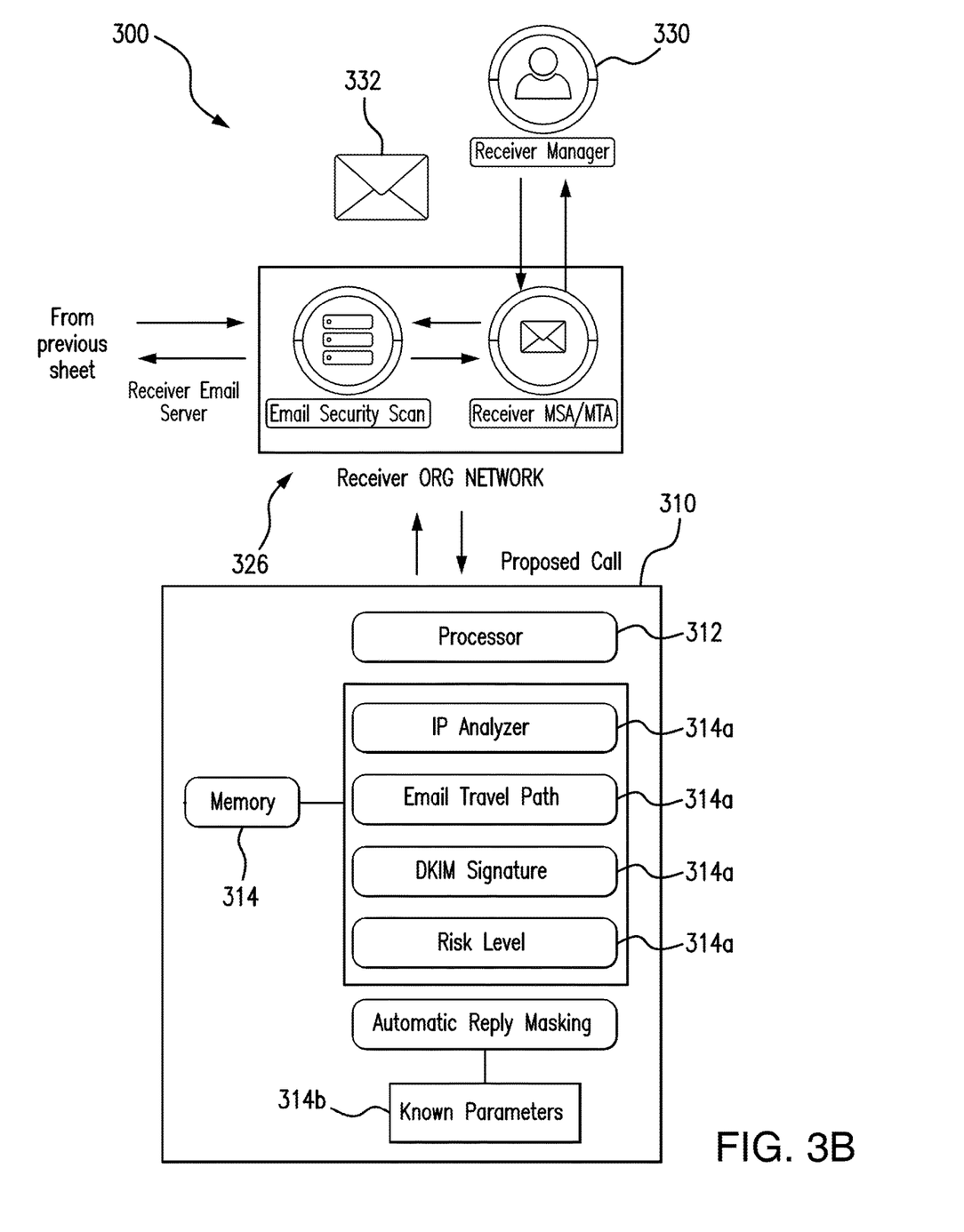
Figure 4:
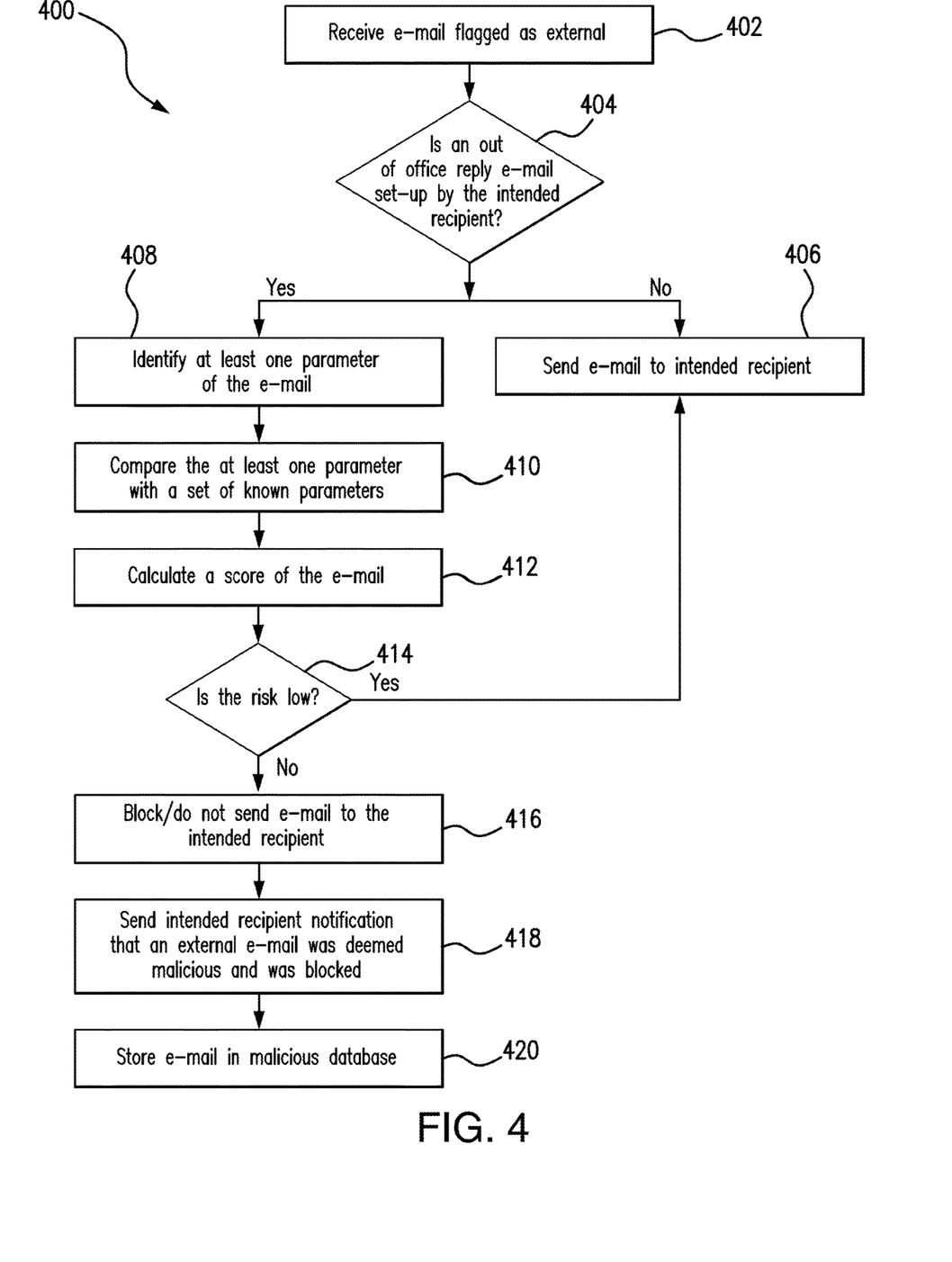
FIG. 4 is a flow diagram illustrating an exemplary set of process operations activated, executed, and completed using the exemplary system architecture of FIG. 3.

Turning now to FIGS. 2-4, FIG. 2 illustrates a system 100 in which one or more aspects of the present disclosure may be implemented. Although the system 100 is presented in one arrangement, other embodiments may include the parts of the system 100 (or other parts) arranged otherwise depending on, for example, relationships between users and parties, numbers of parties, privacy requirements, etc.

The system 100 includes a service provider 102 and a communication device 104 associated with a user 106, each of which is coupled in communication via one or more networks (e.g., as indicted by the arrowed lines, etc.). The communication device 104 can be a desktop, laptop or similar mobile device that connects to the network and can receive and send e-mail. The one or more networks may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof.

The service provider 102 communicates through the network to a server 107 containing a memory 108 and at least one processor 110. The service provider 102 also communicates with a malicious e-mail database 112. It is envisioned that the service provider 102 is associated with an organization or company that uses an antivirus or similar ransomware software 328 (shown in FIG. 3) to determine if an e-mail originates from an external source prior to activating memory 108 processor 110 (shown in FIG. 3) to determine if an e-mail is deemed malicious.

FIG. 3 illustrates system architecture 300 of e-mail flow with system 100 in accordance with the present disclosure. The server 310 of system includes one or more processors 312 and a non-transitory computer-readable medium (e.g., memory 314) including instructions that, when executed by the one or more processors perform various operations. An e-mail sender 320 sends an e-mail 321 to an intended recipient 330. The e-mail 321 first passes through the sender's organization network or service provider 322 and through the network to the service provider 326 of the intended recipient 330. Ideally, the service provider 326 communicates with malware software 328 installed such that the e-mail 321 will pass through a virus scan/blocker 328 prior to reaching the service provider 326. The virus scan/blocker 328 will initially scan the e-mail 321 to verify there are no viruses or known malicious links incorporated within the e-mail 321. Assuming there are no viruses associated with the e-mail 321 the e-mail 321 will be designated as external.

Once the e-mail 321 is designated external, the processor 312 receives the e-mail 321 and confirms an out of office reply e-mail 332 has been set up by the intended recipient 330. In other words, only after the e-mail 321 arrives through the network to the service provider 326 and the e-mail 321 is identified as originating from an external source and an out of office reply e-mail 332 has been set up by the intended recipient 330, will the system 300 initiate the operations to analyze the e-mail 321 further to determine if the out of office reply e-mail 332 can be sent to the sender of e-mail 321 without exposing the architecture of the service provider 326.

To analyze the e-mail 321 further, the processor 312 scans the e-mail 321 to identify at least one parameter 314a of the e-mail. A parameter 314a of the e-mail can include identifying SMTP mail from and return path, evaluating the e-mail travel path, analyzing the e-mail domain to identify origin and location, reading the e-mail client, identifying a DKIM-Signature or its equivalent, and identifying presence of X-UIDL fields. Those skilled in the art will recognize this is not an exhaustive list of parameters associated with e-mails but parameters that are known to identify malicious e-mails. Other similar parameters may be identified without detracting from the scope of the disclosure.

After identifying at least one parameter 314a, the processor compares the identified parameter to a set of known parameters 314b. Comparing the parameters 314a to parameters 314b can include comparing the SMTP mail from and return path to identify a match, evaluating the e-mail travel path to determine if origin is a suspicious source, analyzing the e-mail domain to identify if origin and location is from a suspicious zone, reading the e-mail client, identifying a DKIM-Signature or its equivalent and analyzing its presence, and identifying presence of X-UIDL fields.

Based on the comparison of the at least one parameter 314a to a set of known parameters 314b, the processor 312 calculates a score for the e-mail 321. The e-mail 321 is scored as either low, medium, or high, in some examples. An e-mail classified as low is deemed safe whereas an e-mail classified as either medium or high exceeds a threshold value characterizing the e-mail as unsafe (i.e., malicious). When the e-mail 321 is classified as low the system 100 forwards the e-mail 321 to the intended recipient 330 and in turn, the automatically generated out of office reply e-mail 332 is sent to the sender 320.

While described in some examples as low, medium, or high, other classifications of the score are contemplated. For example, the score may be a binary score (e.g., 0 or 1), a decimal value (e.g., a range from 0-100), a color-scheme (e.g., red or green), or any other scheme for conveying the output of the score calculation.

Continuing with the example of FIG. 3, when the e-mail 321 is classified as either medium or high (i.e., above the threshold value), the e-mail 321 is blocked and not sent to the intended recipient 330. Instead, the e-mail 321 is forwarded to the malicious e-mail database 112 and stored. Accordingly, the out of office reply e-mail 332 is also blocked by the processor 312 and does not reach the sender 320 of e-mail 321. The intended recipient 330 receives a notification that an e-mail 321 from an external source was sent to their inbox, however the e-mail 321 was labeled malicious. The intended recipient 330 can contact their service provider 326 to gain access to the e-mail 321 if the intended recipient 330 believes the e-mail 321 is not malicious. E-mails collected within the malicious e-mail database 112 can be aggregated and used during the comparison of the parameters 314a of future e-mails.

While described in some examples with respect to out of office replies (e.g., or vacation replies) set up by a user, aspects of the disclosure are operable to block any form of reply originating from an e-mail client, a server, or other network hardware. For example, an e-mail server associated with a company generates a reply at the server level to indicate that an e-mail address is not, or is no longer, valid. This could reveal to a malicious sender that a person connected with the e-mail address is no longer employed by the company.

With reference now to FIG. 4, a flow diagram 400 of exemplary operations are shown to determine whether an external e-mail is identified as malicious, and the internal architecture of a service provider is blocked. At operation 402, system 100 receives an e-mail identified as originated from an external source. At operation 404, the system 100 recognizes if an out of reply e-mail is set up by the intended recipient. If an out of office reply e-mail was not set up by the intended recipient, the e-mail is forwarded to the recipient at operation 406. If an out of office reply e-mail is set up to automatically respond to e-mails, the system 100 identifies at least one parameter of the e-mail and compares the at least one parameter with a set of known parameters at operations 408 and 410.

At operation 412, a score is generated for the e-mail. If the score is deemed low, at operation 414, the e-mail is forwarded to the intended recipient. If the score is deemed not low, instead either medium or high, the e-mail is blocked and is not sent to the intended recipient at operation 416. At operations 418 and 420, the intended recipient is sent a notification that an external e-mail was deemed malicious and was blocked and the e-mail is stored within the malicious e-mail database.

Figure 5:
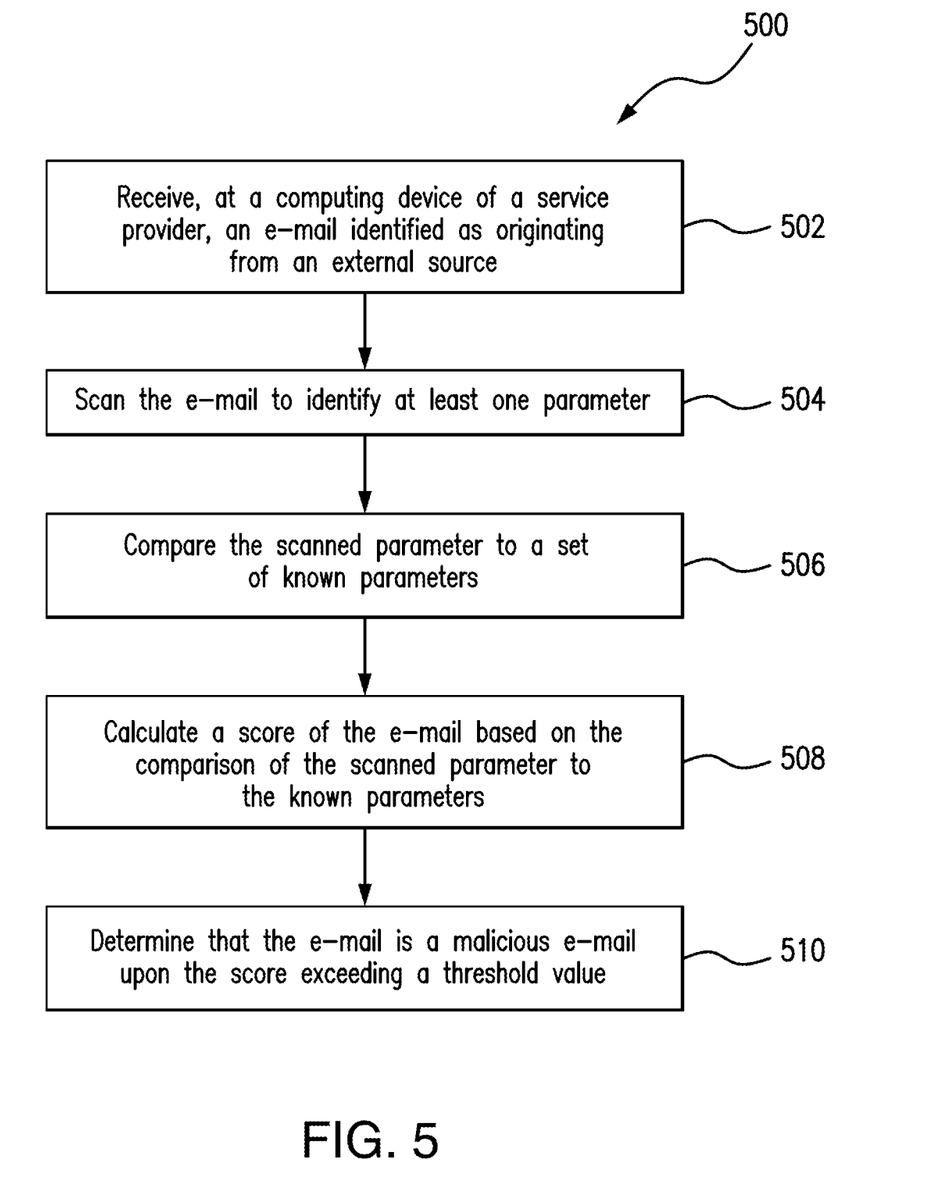
FIG. 5 is a flow diagram illustrating another exemplary set of process operations activated, executed, and completed using the exemplary system architecture of FIG. 3.

With reference now to FIG. 5, a flow diagram 500 of exemplary operations are shown to determine whether an external e-mail is identified as malicious. At operation 502, system 100 receives an e-mail identified as originated from an external source. At operation 504, the system 100 scans the e-mail to identify at least one parameter. At operation 506, the system 100 compares the scanned parameter to one or more of a set of known parameters. At operation 508, the system 100 calculates a score of the e-mail based on the comparison of the scanned parameter to the known parameters. At operation 510, the system determines that the e-mail is a malicious e-mail upon the score exceeding a threshold value.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a computing device of a service provider, an e-mail identified as originating from an external source; (b) scanning the e-mail to identify at least one parameter only when an out of office reply is setup by a recipient of the e-mail; (c) comparing the at least one scanned parameter to a set of known parameters; (d) calculating a score of the e-mail based on the comparison of the at least one parameter to a set of known parameters; (e) determining the e-mail to be a malicious e-mail if the score exceeds a threshold value; and (f) blocking an out of office reply based on the threshold value.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Additional Examples

In some examples, a computer-implemented method automatically identifies a malicious e-mail and blocks an out of office reply. The exemplary method comprises receiving, at a computing device of a service provider, an e-mail identified as originating from an external source; scanning the e-mail to identify at least one parameter; comparing the at least one scanned parameter to a set of known parameters; calculating a score of the e-mail based on the comparison of the at least one parameter to known parameters; determining that the e-mail is a malicious e-mail upon the score exceeding a threshold value; and blocking an out of office reply.

In some examples, a computer-implemented method automatically identifies a malicious e-mail. The method comprises receiving, at a computing device of a service provider, an e-mail identified as originating from an external source; scanning the e-mail to identify at least one parameter; comparing the at least one scanned parameter to a set of known parameters; calculating a score of the e-mail based on the comparison of the at least one parameter to known parameters; and determining that the e-mail is a malicious e-mail upon the score exceeding a threshold value. An out of office reply e-mail is blocked by the service provider based on the score.

In some examples, a network device comprises one or more processors and a non-transitory computer-readable medium. The non-transitory computer-readable medium includes instructions that, when executed by the one or more processors, cause the one or more processors to perform operations including: receiving, at a computing device of a service provider, an e-mail identified as originating from an external source; scanning the e-mail to identify at least one parameter only when an out of office reply is setup by a recipient of the e-mail; comparing the at least one scanned parameter to a set of known parameters; calculating a score of the e-mail based on the comparison of the at least one parameter to known parameters; determining that the e-mail is a malicious e-mail upon the score exceeding a threshold value; and blocking an out of office reply based on the threshold value.

Alternatively, or in addition to the other examples described herein, examples include any combination of the following:

wherein the operation of scanning the e-mail is executed only when an out of office reply is setup by a recipient of the e-mail;

wherein the score is a value defined as low, medium, and high and the malicious e-mail is based on a score of medium or high;

wherein the out of office reply is sent when the score is low;

further comprising notifying a recipient of the e-mail and the service provider after blocking the out of office reply;

wherein the operation of identifying at least one parameter includes: identifying SMTP mail from and return path; evaluating an e-mail travel path; analyzing an e-mail domain to identify origin and location; reading an e-mail client; identifying a DKIM-Signature or its equivalent; and identifying presence of X-UIDL fields;

wherein the operation of comparing includes: comparing the SMTP mail from and return path to identify a match; evaluating an e-mail travel path to determine if origin is a suspicious source; analyzing an e-mail domain to identify if origin and location is from a suspicious zone; reading an e-mail client; identifying a DKIM-Signature or its equivalent and analyzing its presence; and identifying presence of X-UIDL fields; and storing, in a database, one or more of the following: the at least one parameter, the e-mail, the set of known parameters, the score, and the threshold.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for automatically identifying a malicious e-mail and blocking an out of office reply, the method comprising:

receiving, at a computing device of a service provider, an e-mail identified as originating from an external source;

scanning the e-mail to identify at least one parameter;

comparing the at least one scanned parameter to a set of known parameters, wherein comparing includes reading an e-mail client and performing one or more of the following:

comparing an e-mail SMTP from and return path to identify a match, evaluating an e-mail travel path to determine if an origin is a suspicious source, analyzing an e-mail domain to identify if the origin and a location is from a suspicious zone, identifying a DKIM-Signature or its equivalent and analyzing its presence, and identifying a presence of an X-UIDL field;

calculating a score of the e-mail based on the comparison of the at least one scanned parameter to the set of known parameters;

determining that the e-mail is a malicious e-mail upon the score exceeding a threshold value; and blocking an out of office reply.

2. The computer-implemented method of claim 1, wherein the score is a value defined as low, medium, and high and the malicious e-mail is based on a score of medium or high.

3. The computer-implemented method of claim 2, wherein the out of office reply is blocked when the score is medium or high.

4. The computer-implemented method of claim 1, wherein the operation of scanning the e-mail is executed only when an out of office reply is setup by a recipient of the e-mail.

5. The computer-implemented method of claim 1, further comprising notifying a recipient of the e-mail and the service provider after blocking the out of office reply.

6. The computer-implemented method of claim 1, wherein the operation of identifying at least one parameter includes: identifying the e-mail SMTP from and return path; evaluating the e-mail travel path; analyzing the e-mail domain identifying the DKIM-Signature or its equivalent; and identifying the presence of the X-UIDL field.

7. A computer-implemented method for automatically identifying a malicious e-mail, the method comprising:
 receiving, at a computing device of a service provider, an e-mail identified as originating from an external source;
 scanning the e-mail to identify at least one parameter;
 comparing the at least one scanned parameter to a set of known parameters, wherein comparing includes reading an e-mail client and performing one or more of the following:
  comparing an e-mail SMTP from and return path to identify a match,
  evaluating an e-mail travel path to determine if an origin is a suspicious source,
  analyzing an e-mail domain to identify if the origin and a location is from a suspicious zone,
  identifying a DKIM-Signature or its equivalent and analyzing its presence, and
  identifying a presence of an X-UIDL field;
 calculating a score of the e-mail based on the comparison of the at least one scanned parameter to the set of known parameters; and
 determining that the e-mail is a malicious e-mail upon the score exceeding a threshold value, wherein an out of office reply e-mail is blocked by the service provider based on the score.

8. The computer-implemented method of claim 7, wherein the score is a value defined as low, medium, and high and the malicious e-mail is based on a score of medium or high.

9. The computer-implemented method of claim 8, wherein the out of office reply is blocked when the score is medium or high.

10. The computer-implemented method of claim 7, wherein the operation of scanning the e-mail is executed only when an out of office reply is setup by a recipient of the e-mail.

11. The computer-implemented method of claim 7, further comprising notifying a recipient of the e-mail and the service provider after blocking the out of office reply.

12. The computer-implemented method of claim 7, wherein the operation of identifying at least one parameter includes: identifying the e-mail SMTP from and return path; evaluating the e-mail travel path; analyzing the e-mail domain identifying the DKIM-Signature or its equivalent; and identifying the presence of the X-UIDL field.

13. A network device, comprising:
 one or more processors; and
 a non-transitory computer-readable medium including instructions that, when executed by the one or more processors, cause the one or more processors to perform operations including:
  receiving, at a computing device of a service provider, an e-mail identified as originating from an external source;
  scanning the e-mail to identify at least one parameter only when an out of office reply is setup by a recipient of the e-mail;
  comparing the at least one scanned parameter to a set of known parameters, wherein comparing includes reading an e-mail client and performing one or more of the following:
   comparing an e-mail SMTP from and return path to identify a match,
   evaluating an e-mail travel path to determine if an origin is a suspicious source,
   analyzing an e-mail domain to identify if the origin and a location is from a suspicious zone,
   identifying a DKIM-Signature or its equivalent and analyzing its presence, and
   identifying a presence of an X-UIDL field;
  calculating a score of the e-mail based on the comparison of the at least one scanned parameter to the set of known parameters;
  determining that the e-mail is a malicious e-mail upon the score exceeding a threshold value; and
  blocking an out of office reply based on the threshold value.

14. The network device of claim 13, wherein the score is a value defined as low, medium, and high and the malicious e-mail is based on a score of medium or high.

15. The network device of claim 14, wherein the out of office reply is blocked sent when the score is medium or high.

16. The network device of claim 13, wherein the operation of scanning the e-mail is executed only when an out of office reply is setup by a recipient of the e-mail.

17. The network device of claim 13, wherein the non-transitory computer-readable medium includes further instructions of notifying a recipient of the e-mail and the service provider after blocking the out of office reply.

18. The network device of claim 13, wherein the non-transitory computer-readable medium includes further instructions of storing, in a database, one or more of the following: the at least one parameter, the e-mail, the set of known parameters, the score, and the threshold value.

19. The network device of claim 13, wherein the non-transitory computer-readable medium includes further instructions of identifying the e-mail SMTP from and return path; evaluating the e-mail travel path; analyzing the e-mail domain; identifying the DKIM-Signature or its equivalent; and identifying the presence of the X-UIDL field.

20. The network device of claim 13, wherein the score is a binary score or a decimal value.

* * * * *